United States Patent
Beroth et al.

(10) Patent No.: US 6,692,069 B2
(45) Date of Patent: Feb. 17, 2004

(54) AIRCRAFT SLEEPER SEAT

(75) Inventors: Michael T. Beroth, Winston-Salem, NC (US); Gregory Hall, Winston-Salem, NC (US); Ross Laming, High Point, NC (US); Bobby Lawson, Walnut Cove, NC (US); Stacy McAnulty, Kernersville, NC (US); Tracy Pence, Winston-Salem, NC (US); Tommy G. Plant, Winstom-Salem, NC (US); Al Wenzler, Winston-Salem, NC (US)

(73) Assignee: B E Aerospace, Inc., Wellington, FL (US)

( * ) Notice: Subject to any disclaimer, the term of this patent is extended or adjusted under 35 U.S.C. 154(b) by 0 days.

(21) Appl. No.: 10/199,866

(22) Filed: Jul. 19, 2002

(65) Prior Publication Data

US 2003/0080597 A1 May 1, 2003

Related U.S. Application Data

(60) Provisional application No. 60/306,717, filed on Jul. 20, 2001.

(51) Int. Cl.[7] .................. A47C 13/00; A47C 17/17; A47C 1/02; B60N 2/34; B64D 11/06
(52) U.S. Cl. .................. 297/118; 297/115; 297/354.13; 297/411.3; 297/411.36; 297/329; 297/330; 244/118.6
(58) Field of Search ................. 297/118, 115, 297/329, 330, 354.13, 411.36, 411.3; 244/118.6

(56) References Cited

U.S. PATENT DOCUMENTS

| | | |
|---|---|---|
| 4,790,496 A | 12/1988 | Marrujo |
| 5,560,683 A | 10/1996 | Penley |
| 5,615,928 A | 4/1997 | Penley |
| 5,636,898 A | 6/1997 | Dixon |
| 5,727,845 A | 3/1998 | Jackson-Wynch |
| 5,735,578 A | 4/1998 | Penley |
| 5,775,642 A | 7/1998 | Beroth |
| D421,948 S | 3/2000 | Dryburgh |
| 6,059,364 A | 5/2000 | Dryburgh .............. 297/354.13 |
| 6,170,786 B1 | 1/2001 | Park |
| D439,063 S | 3/2001 | Round |
| 6,209,956 B1 | 4/2001 | Dryburgh .......... 297/354.13 X |
| 6,305,644 B1 | 10/2001 | Beroth .............. 297/354.13 X |
| 6,352,309 B1 * | 3/2002 | Beroth .................. 297/354.13 |
| 6,494,536 B2 * | 12/2002 | Plant ................. 297/354.13 X |
| 2001/0015566 A1 * | 8/2001 | Park et al. .................. 297/115 |
| 2003/0085597 A1 * | 5/2003 | Ludeke et al. ......... 297/354.13 |

FOREIGN PATENT DOCUMENTS

| | | |
|---|---|---|
| EP | 1162138 | 12/2001 |
| FR | 2769286 | 4/1999 |
| GB | 2280363 | 2/1995 |
| GB | 2284146 | 5/1995 |
| GB | 2295962 | 6/1996 |
| GB | 2288973 | 5/1998 |
| GB | 2326824 | 1/1999 |
| GB | 2331237 | 5/1999 |
| WO | WO00/21831 | 4/2000 |

* cited by examiner

*Primary Examiner*—Rodney B. White
(74) *Attorney, Agent, or Firm*—Adams Evans P.A.

(57) ABSTRACT

A reclining passenger seat, including a seat frame for being attached to a supporting deck, a seat bottom carried by the seat frame, and a seat back carried by the seat frame and moveable with the seat bottom from and between the upright and sleep positions. A legrest assembly is mounted adjacent a forward end of the seat bottom for being selectively extended generally downwardly and outwardly from the seat bottom for supporting the legs of the passenger. An armrest assembly is carried by the seat frame and includes an armrest moveable between a horizontal position with an upper support surface supporting a forearm of the seat occupant in the upright seat position and a forwardly-inclined, lowered position wherein the upper support surface is aligned with an upper surface of the seat bottom for providing a wider sleeping surface for the seat occupant when the seat is in the fully-reclined sleep position.

10 Claims, 15 Drawing Sheets

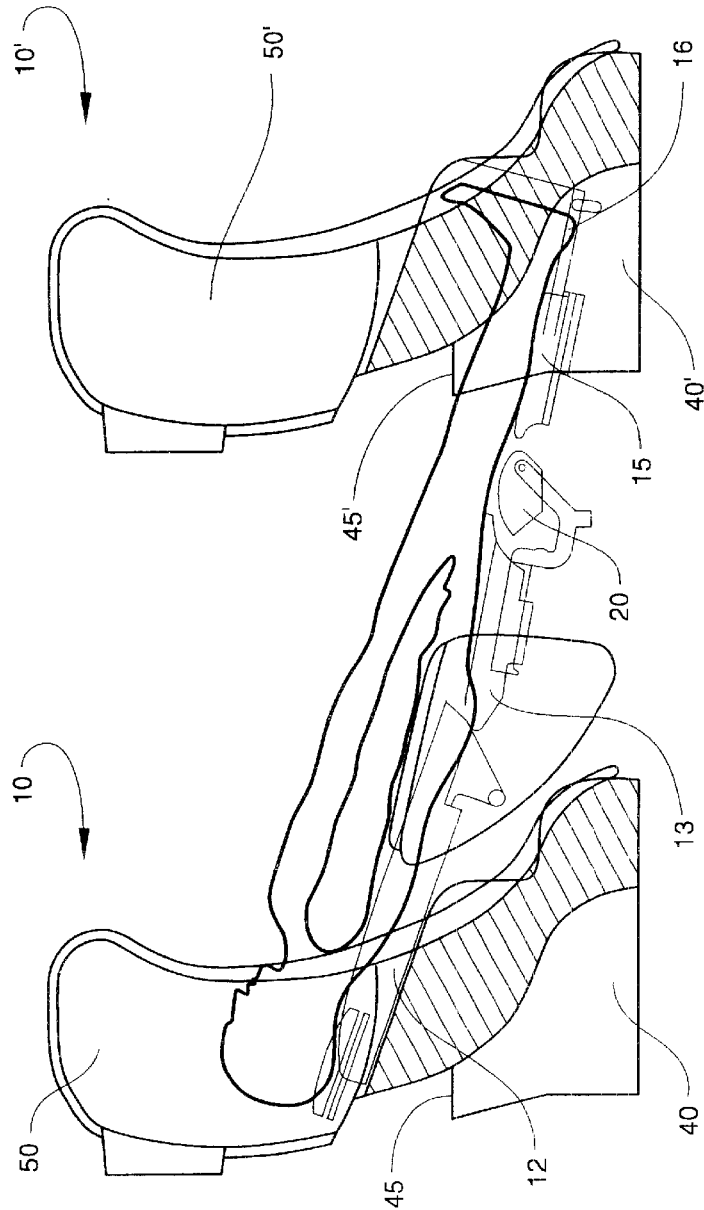
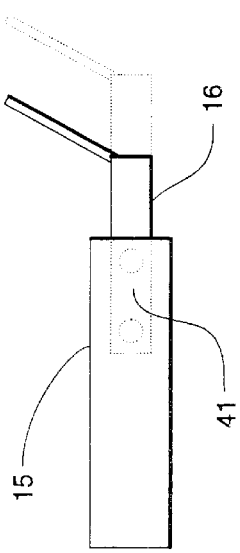

AIRCRAFT SLEEPER SEAT

TECHNICAL FIELD AND BACKGROUND OF THE INVENTION

This application is based on and claims priority from Provisional Application Serial No. 60/306,717, filed Jul. 20, 2001.

This invention relates to a sleeper seat intended for passenger conveyances including, but not limited to, airplanes. Although the sleeper seat disclosed in the present application may be utilized in any type of aircraft, the sleeper seat is preferably intended to be utilized for carrying first class or business class passengers traveling on long-haul flights. The objective of the design is to achieve an ergonomic lie-flat sleeper seat that is electrically driven and is adaptable to many different seating arrangements.

SUMMARY OF THE INVENTION

Therefore, it is an object of the invention to provide a seat that may be moved between an upright position and a sleeping position.

It is another object of the invention to provide a sleeper seat that includes a rotating bolster interconnecting the seat pan and legrest portions of the seat for permitting the overall length of the seat pan to be increased as the legrest translates away from the seat back when the sleeper seat is moved from a fully-upright position to a fully-reclined position.

It is another object of the invention to provide a sleeper seat that includes an armrest assembly that articulates and changes height as the seat moves to provide the most comfortable arm position for the passenger.

It is another object of the invention to provide a sleeper seat that has an armrest that lowers to a position providing greater seat bottom width when the seat is in the sleeper position.

It is another object of the invention to provide a sleeper seat that is electrically driven.

It is another object of the invention to provide a sleeper seat that includes a privacy shell or "surround" for providing privacy to the seat occupant in the reclined sleep position.

It is another object of the invention to provide a sleeper seat that is comfortable.

It is another object of the invention to provide a sleeper seat that is durable.

It is another object of the invention to provide a sleeper seat which is lightweight and extensible.

These and other objects of the present invention are achieved in the preferred embodiments disclosed below by providing a reclining passenger seat, comprising a seat frame for being attached to a supporting deck, a seat bottom carried by the seat frame, and a seat back carried by the seat frame and moveable with the seat bottom from and between the upright and sleep positions. A legrest assembly is mounted adjacent a forward end of the seat bottom for being selectively extended generally downwardly and outwardly from the seat bottom for supporting the legs of the passenger. An armrest assembly is carried by the seat frame and includes an armrest moveable between a horizontal position with an upper support surface supporting a forearm of the seat occupant in the upright seat position and a forwardly-inclined, lowered position wherein the upper support surface is aligned with an upper surface of the seat bottom for providing a wider sleeping surface for the seat occupant when the seat is in the fully-reclined sleep position.

According to one preferred embodiment of the invention, the armrest includes an intermediate, rearwardly-inclined position for supporting the forearm of the seat occupant in the semi-reclined seat position.

According to another preferred embodiment of the invention, the support surface of the armrest is parallel to an upper support surface of the seat bottom in the upright, intermediate, and sleeper positions.

According to yet another preferred embodiment of the invention, a pivot is provided for mounting the armrest by an aft portion thereof to a fixed pivotable position on the seat back, and a linkage pivotally is attached by respective upper ends to a forward end of the armrest and by a lower end to an elongate slide rail mounted to the seat frame. The lower end of the linkage is attached by a linear slide to the slide rail for sliding movement along the slide rail during transition of the seat between the upright and sleep positions.

According to yet another preferred embodiment of the invention, a bolster is positioned adjacent a forward end of the seat bottom and moveable between a retracted position when the seat is in the upright position, and a deployed position when the seat is in the semi-reclined seat position and in the sleep position for providing support to the back of the leg and knee of the seat occupant.

According to yet another preferred embodiment of the invention, a stationary privacy shell is mounted aft of the seat frame for providing lateral privacy to the seat occupant when in the sleep position.

According to yet another preferred embodiment of the invention, the privacy shell includes a footwell for accommodating feet of an aft-seated seat occupant.

According to yet another preferred embodiment of the invention, the privacy shell includes a pivotally-mounted breakaway panel mounted on an aft-facing side of the privacy shell in a predefined head strike path for controlled forward movement about a pivot point in a crash situation wherein the head of an aft-seated seat occupant strikes the breakaway panel.

According to yet another preferred embodiment of the invention, the privacy shell includes an ingress/egress step formed therein and for permitting one aft-seated seat occupant to step over the legs of an adjacent seat occupant when ingressing or egressing the seat.

According to yet another preferred embodiment of the invention, the slide rail includes rack teeth thereon cooperating with a pinion gear driven by a drive actuator for movement of the seat back and seat bottom and the seat frame includes guide slots in opposing lateral sides thereof in which are mounted guide rollers carried by the seat bottom and the seat back for guiding translational movement of the seat bottom and seat back.

According to yet another preferred embodiment of the invention, a reclining passenger seat is provided, comprising a seat frame for being attached to a supporting deck, a seat bottom carried by the seat frame, and a seat back carried by the seat frame and moveable with the seat bottom from and between the upright and sleep positions. A legrest assembly is mounted adjacent a forward end of the seat bottom for being selectively extended generally downwardly and outwardly from the seat bottom for supporting the legs of the passenger. An armrest assembly carried by the seat frame and includes an armrest moveable between a horizontal position with an upper support surface supporting a forearm of the seat occupant in the upright seat position. A forwardly-inclined, lowered position wherein the upper support surface is aligned with an upper surface of the seat bottom for providing a wider sleeping surface for the seat occupant when the seat is in the fully-reclined sleep position. An intermediate, rearwardly-inclined position is provided for supporting the forearm of the seat occupant in the semi-reclined seat position. The support surface of the armrest is parallel to an upper support surface of the seat bottom in the upright, intermediate, and sleeper positions.

DESCRIPTION OF THE DRAWINGS

Some of the objects of the invention have been set forth above. Other objects and advantages of the invention will appear as the description proceeds when taken in conjunction with the following drawings, in which:

FIG. 5 is an environmental side view of the sleeper seat with the privacy shell in place, and showing the seat in the fully-reclined position and placed behind another like seat;

FIG. 6 is a partial side view of the footrest assembly of the sleeper seat shown in FIG. 5;

DESCRIPTION OF THE PREFERRED EMBODIMENT AND BEST MODE

Figure 1:
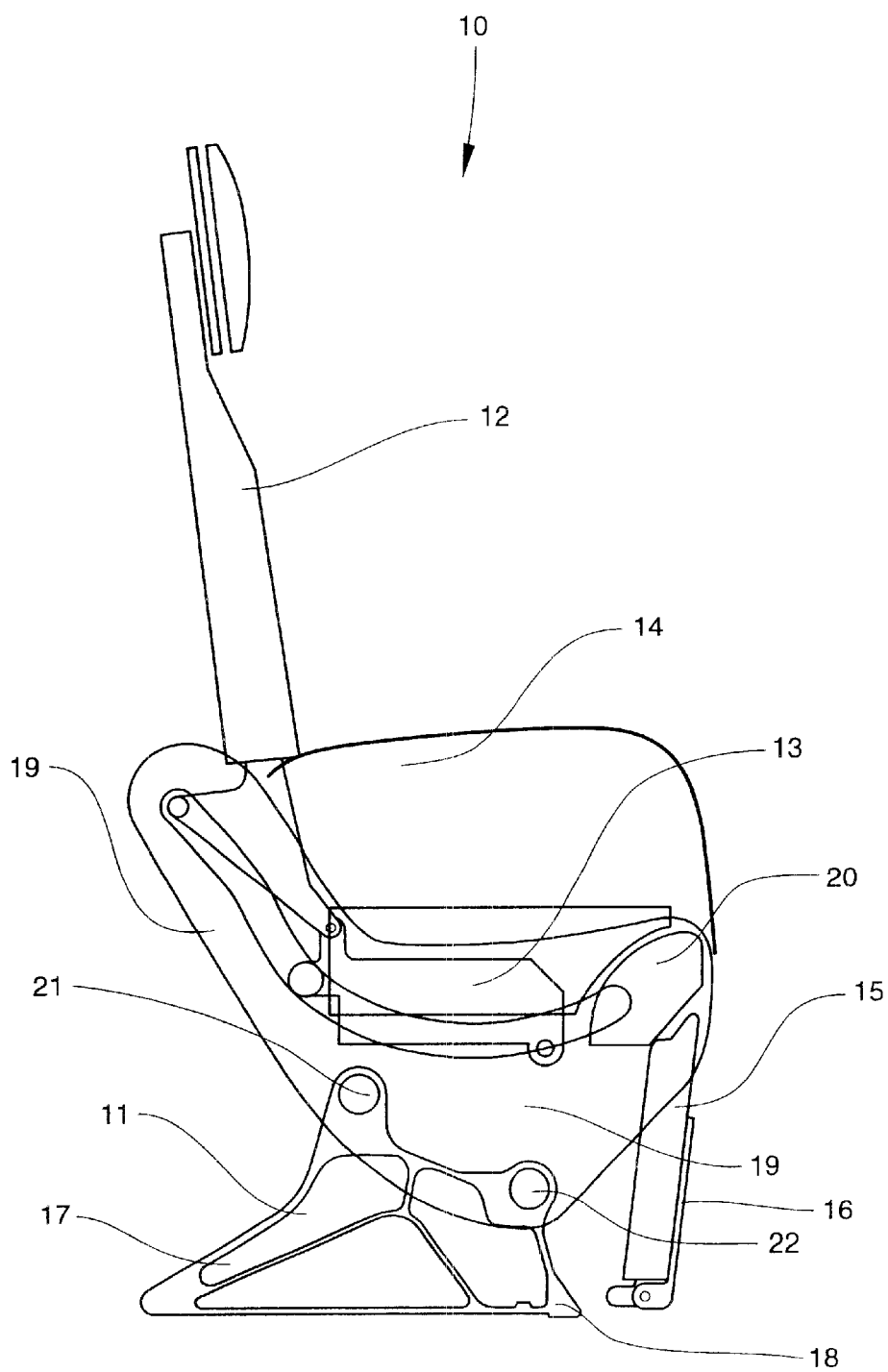
FIG. 1 is a side elevation of a sleeper seat according to one preferred embodiment of the invention in the fully upright position and with the privacy shell removed for clarity.

Referring now specifically to the drawings, a sleeper seat according to the present invention is generally illustrated in FIG. 1 and indicated at broad reference numeral 10. The sleeper seat 10 in FIG. 1, shown without the privacy shell for clarity, is in a fully upright position, and includes a seat frame 11, seat back assembly 12, seat pan, or bottom 13, armrest 14, legrest 15 and footrest 16. The seat frame 11 of the sleeper seat 10 is adapted for being attached to an existing track on an aircraft deck using conventional track fittings. The seat frame 11 includes two seat legs 17, 18, each of which are spaced-apart and interconnected by respective structural members, or "spreaders" 19 (only one spreader is shown). A bolster 20 is provided for supporting the back of the seat occupant's leg in a semi-reclined and fully reclined position. The seat 11 is supported on two laterally-extending beams 21, 22 in a conventional manner.

Figure 2:
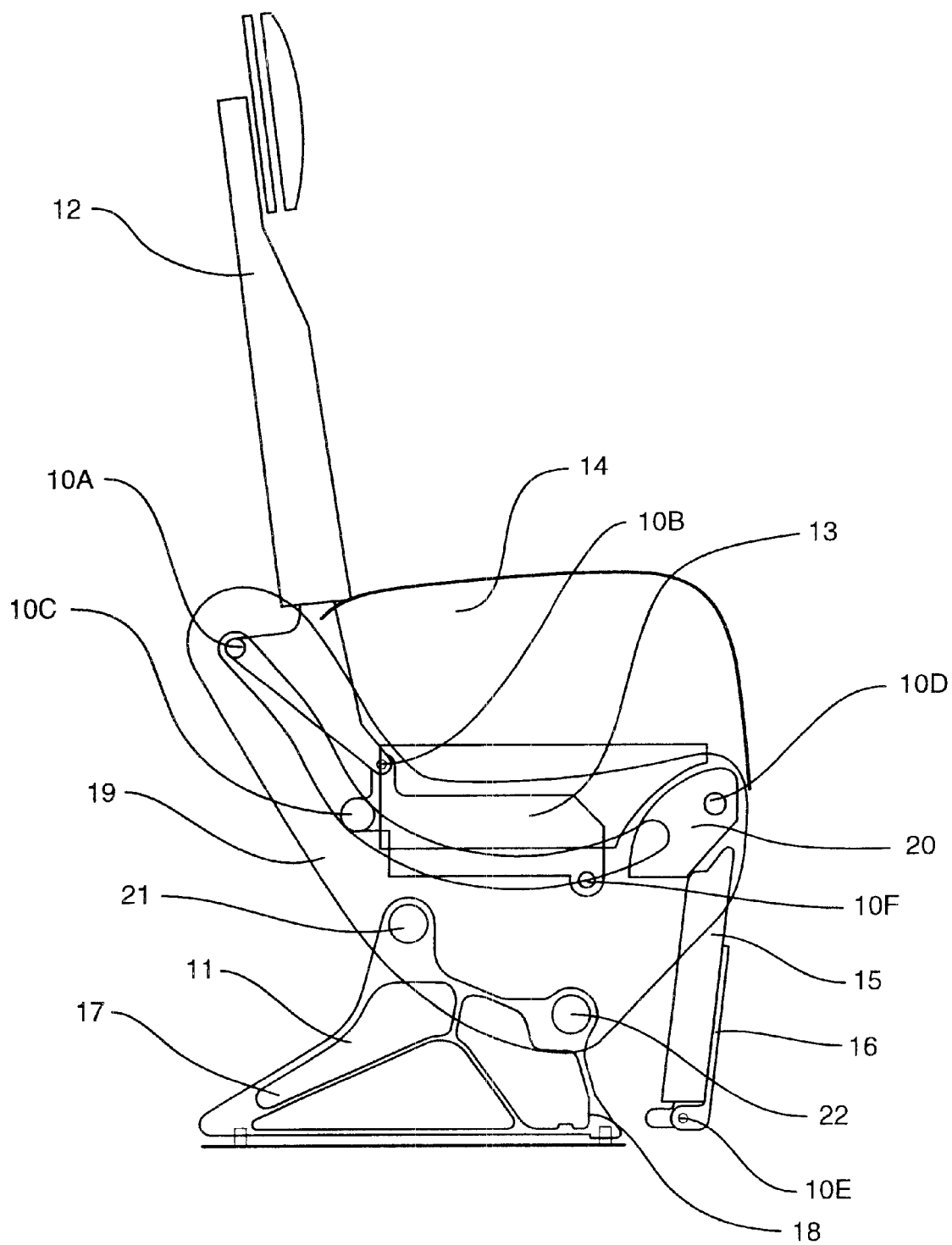
FIG. 2 is a side elevation of the sleeper seat according to FIG. 1 with additional detail.
Figure 3:
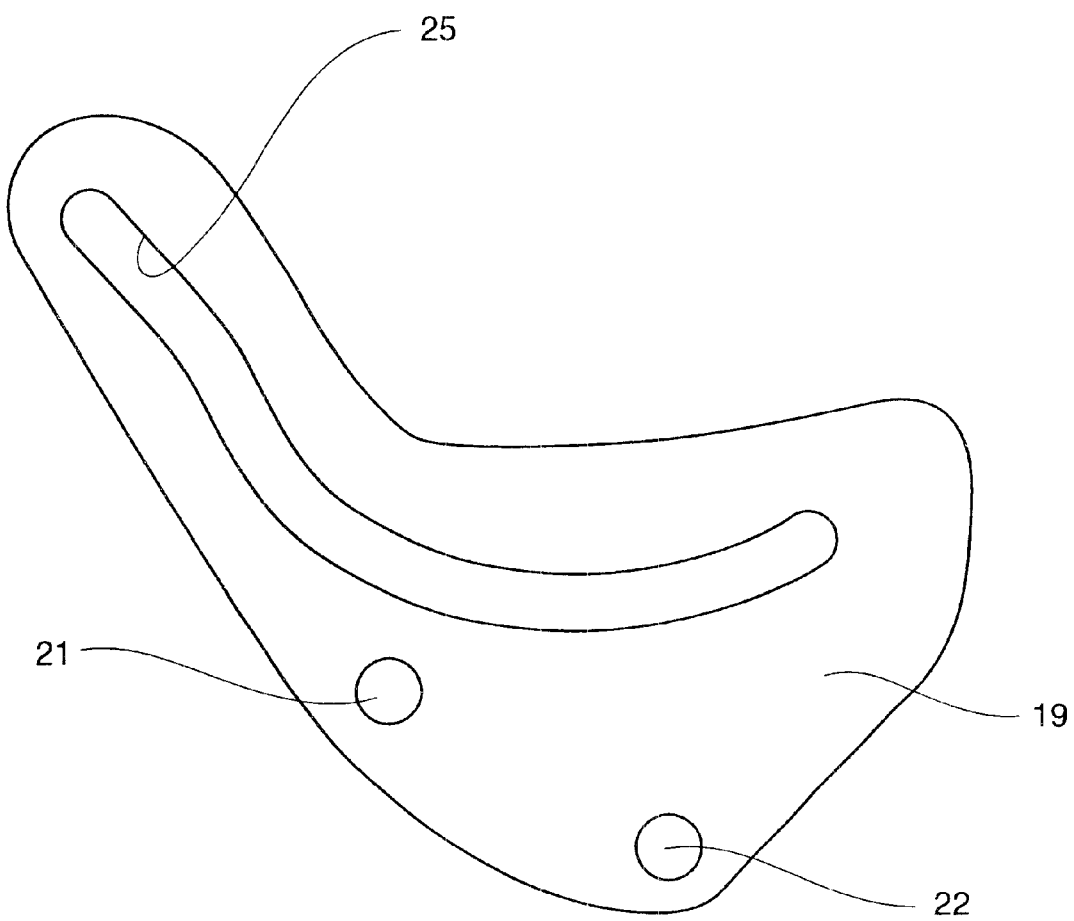
FIG. 3 is a side view of a spreader used in the sleeper seat according to FIG. 1.
Figure 4:
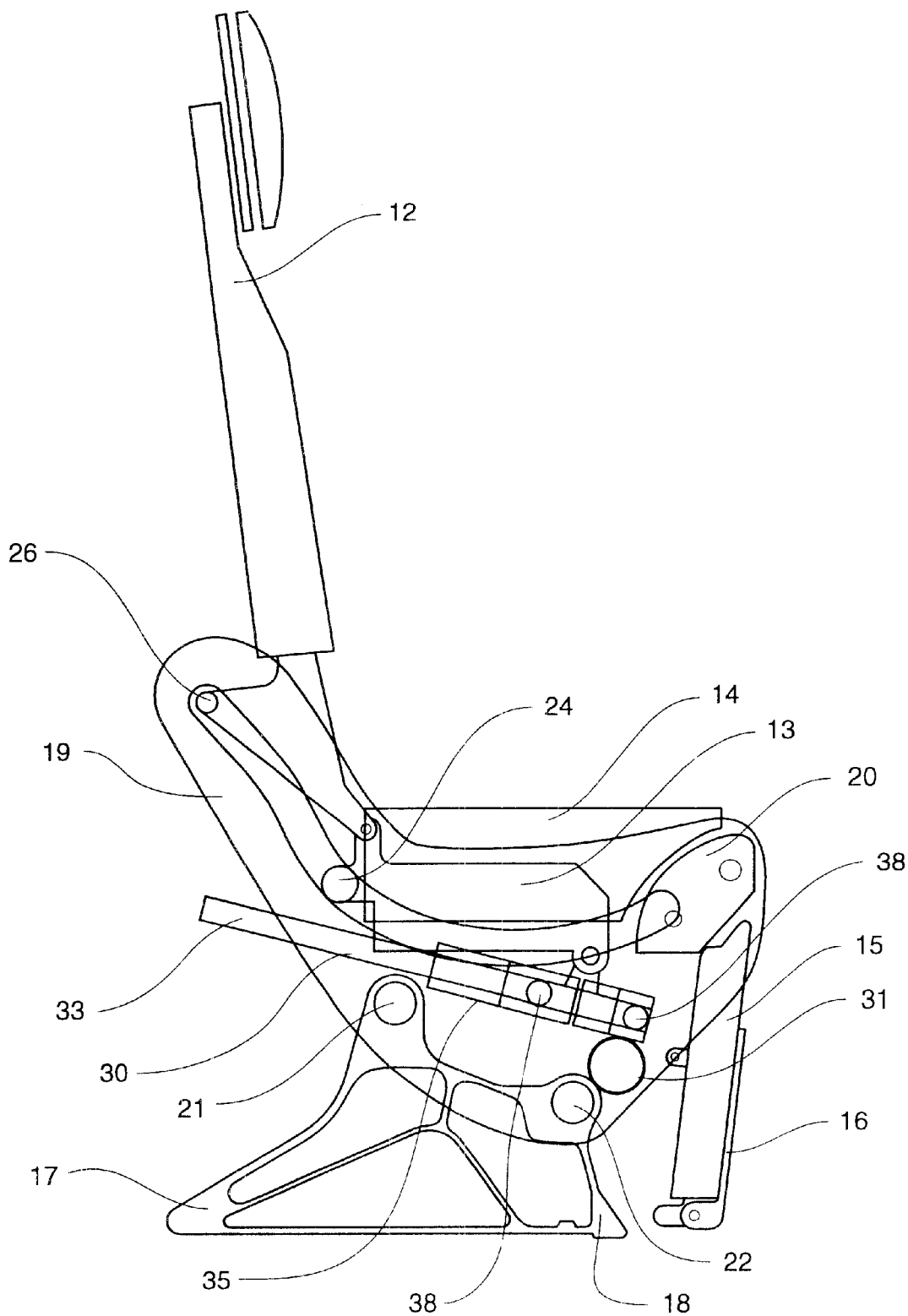
FIG. 4 is a side elevation of the sleeper seat according to FIG. 1 and showing a rack and pinion slide mechanism for translating the seat between seating positions.

As is shown in FIGS. 2, 3 and 4, seat 10 is provided with several pivot points 10A–10F, each spreader includes a curved slot 25 which receives components of the seat bottom 13 for permitting pivotal movement of the seat bottom 13 relative to the spreader 19 and to the seat back 12.

The seat back 12 is attached by to the seat frame 11 at pivot location 10A, and to the seat bottom at pivot location 10B. The seat back 12 is also attached to the seat frame 11 by a roller mechanism 26 guided in slot 25 which permits pivotal and sliding movement of the seat back 12 relative to the spreader 19 and other seat frame components. The seat back 12 is attached to the seat bottom at pivot location 10B that permits pivotal movement of the seat back 12 relative to the seat bottom 13. The seat bottom 13 is attached to the seat frame 11 at pivot location 10C using another roller mechanism 27, and at pivot location 10F for permitting pivotal movement of the seat bottom 13 relative to the seat frame 11.

The bolster 20 is pivotally linked to the seat bottom 13 and to the legrest 15. The seat bottom 13 is connected to the bolster 20 at pivot location 10D, and pivots between a retracted position as shown in FIG. 2 to a fully extended position as shown in FIG. 5 for providing support behind the passenger's knees when the sleeper seat is in either the semi-reclining or fully reclined position. In addition to being employed in any one of the sleeper seats of the present invention, the bolster 20 shown in FIGS. 2, 4, 5 and 6 may be adapted for use in any one of the other seats manufactured by the applicant and intended for use in aircraft or other transportation vehicles.

The footrest 16 is connected to the distal end of the legrest 15 at pivot location 10E, and permits the footrest 16 to move between the closed position shown in FIG. 2 in which the footrest 16 is positioned adjacent and engages the forward-facing surface of the legrest 15, and an open position as shown in FIG. 5 in which the footrest 16 pivots around pivot location 10E so that the footrest 16 extends outwardly from and is positioned at an angle to the legrest 15.

Referring now to FIG. 4, the sleeper seat 10 also includes an elongate rack gear 30 and pinion drive gear 31 driven by a drive actuator (not shown) and a pair of slide rails 33 which cooperate together to control translational movement of the seat bottom 13. Only one slide rail 33 is shown in FIG. 4. The slide rail 33 is positioned in spaced-apart, parallel relation to each other. As is shown in FIG. 4, the slide rail 33 engages and cooperates with a linear slide 35 that extends along part of the length of the slide rail 33. The slide rail 33 includes an integrally formed pivot point which is connected to the seat bottom 13 at pivot location 10F. Each slide rail 33 is movably connected to the seat frame by a set of at least two translation rollers 37, 38.

The linear motion of each of the slide rails 33 is achieved by the rack gear 30 pinion gear 31. The pinion gear 31 transfers rotary motion from a drive actuator to the rack gear 30, thereby producing linear motion of the slide rail 33. Roller 27 follows the path defined by the slot 25 in the spreader 19. As the slide rail 33 moves, the seat bottom 13 translates by rotating about pivot location 10B. The extent to which the seat bottom 13 rotates about pivot location 10B is controlled by the movement of the rollers 26, 27 within the slot 25.

As discussed above, the seat back 12 is attached to the seat bottom at pivot location 10B, and is attached to the seat frame by the seat back rollers 26 at pivot location 10A. Each seat back roller 26 follows an identical path as the seat bottom roller 27. As the seat bottom 13 moves, the seat back 12 simultaneously translates. The seat back 12 rotates about pivot location 10B on the seat bottom 13, and the seat back roller 26 and seat bottom roller 27 in the spreader slot 25 control the extent of the rotation. As noted above, the structure described above is found on opposite lateral sides of the seat 10, allowing the seat 10 to operate in a symmetrical and dynamically balanced manner.

Referring now to FIG. 5, the sleeper seat 10 is shown positioned in spaced-apart relation to a like sleeper seat 10' and in the fully reclined, lie-flat sleeping position. In one preferred embodiment the seats 10 and 10' are positioned to a 57 inch pitch. The seat back 12 and seat bottom 13 in the fully reclined position are each preferably at an 11 degree angle to the horizontal. An enclosed area defines a footwell 40 that extends inwardly into the back side of the sleeper seat 10'. The footwell 40 is shaped for receiving the footrest 16 and lowermost portion of the legrest 15 of the sleeper seat 10 positioned behind sleeper seat 10' when the sleeper seat 10 is in the fully reclined position. A stationary privacy shell is positioned in surrounding relation to the seat back 12 when in the fully reclined position. An egress step 45 is provided below the privacy shell 50 and the footwell 40 and enables an occupant of an inboard seat to ingress and egress over the outstretched legs of a fully reclined outboard-seated occupant.

As is shown in FIG. 6, the footrest 16 includes a safety override 41 that prompts the footrest 16 to move to a retracted position within the distal end of the legrest 15 in the event that a load or other obstruction is applied to the bottom of the footrest 16. Attaching the footrest 16 to the legrest 15 so that the footrest 16 can translate into the legrest 15 in this manner prevents damage to any belongings of a passenger that may be stowed inside of the footwell 40 at the time that extension of the footrest 16 is initiated.

Figure 7:
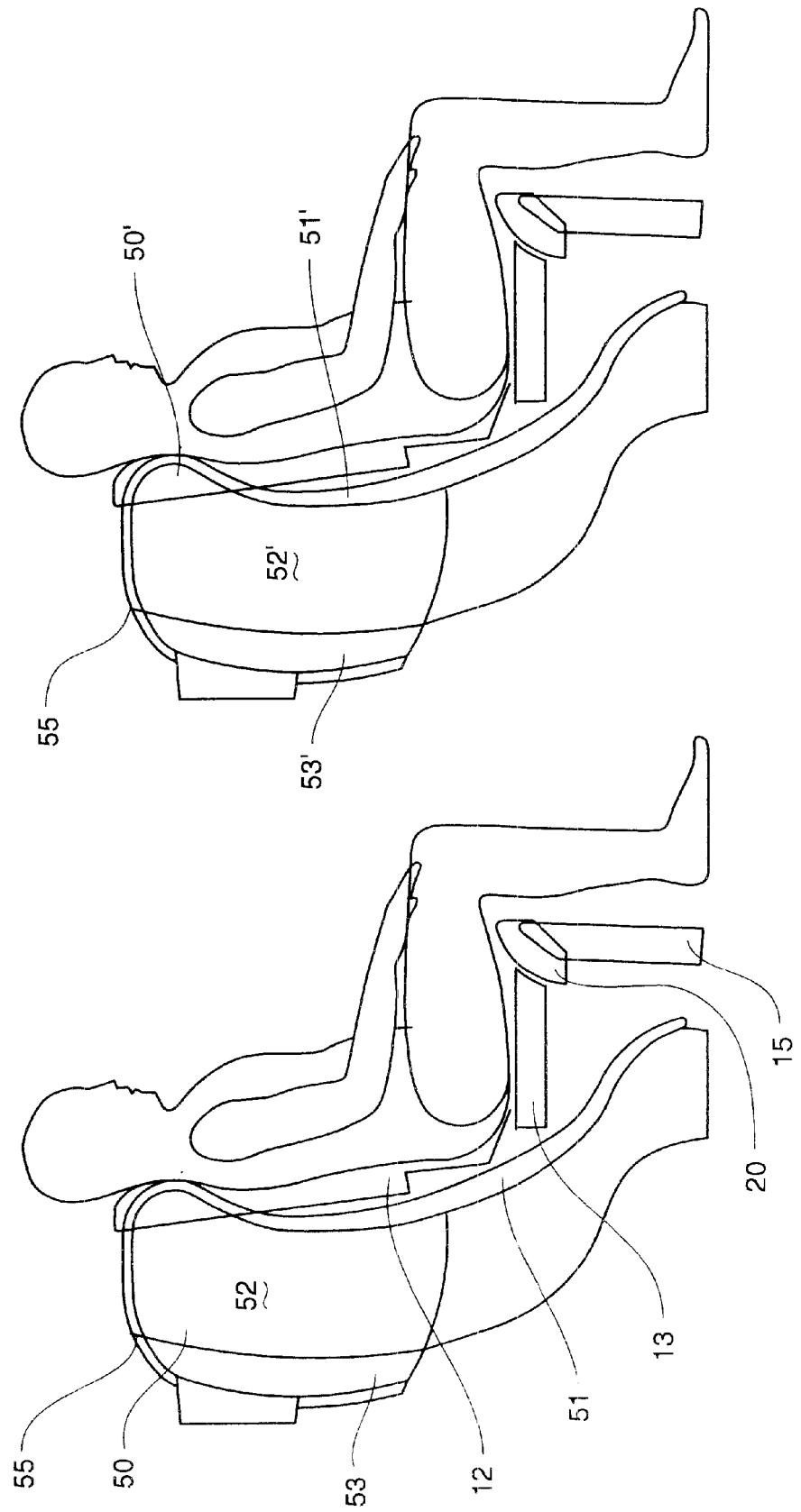
FIG. 7 is schematic side view of two of sleeper seats showing the structure of the privacy shell of each of the seats and the crash breakaway feature of the privacy shell.
Figure 8:
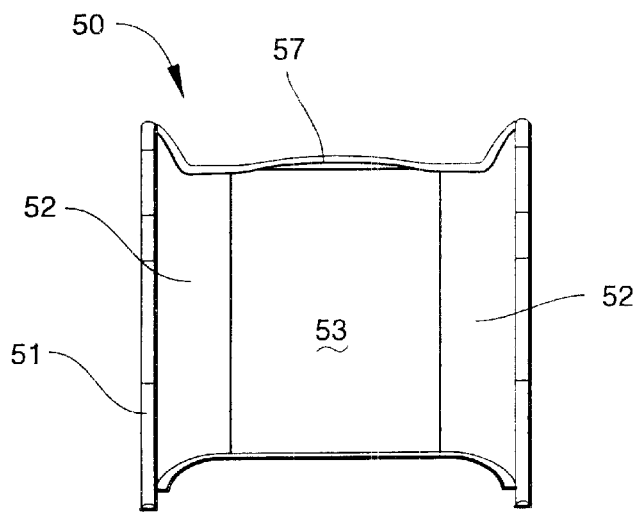
FIG. 8 is a front plan view of one of the privacy shells shown in FIG. 7 and removed from the seat.

Referring now to FIGS. 7 and 8, privacy shell 50 is formed of a fixed tubular structure 51 mounted to the seat frame and comprising three panels two side panels 52, left and right, right shown, and a center panel 53. Seat spacing will cause the seat occupant's head to strike the privacy shell 50 in a crash situation. For this reason, the center panel 53 is designed to break away from the side panels 52 and pivot inwardly about a pivot point 55—the lower end of the privacy shell 50 moving into the space behind the seat back 12 of the forward seat 50' when the seat back 12 is in the upright position as would be the case in a crash situation. The privacy shell 50 may also include an egress handle 57 to assist, in combination with the egress step 45, one occupant to step over the legs of an adjacent occupant. The egress handle 57 also permits an occupant sitting aft of the seat 10 to grasp the handle 57 and use it for assistance in standing up or lowering ones self into the seat.

Figure 9:
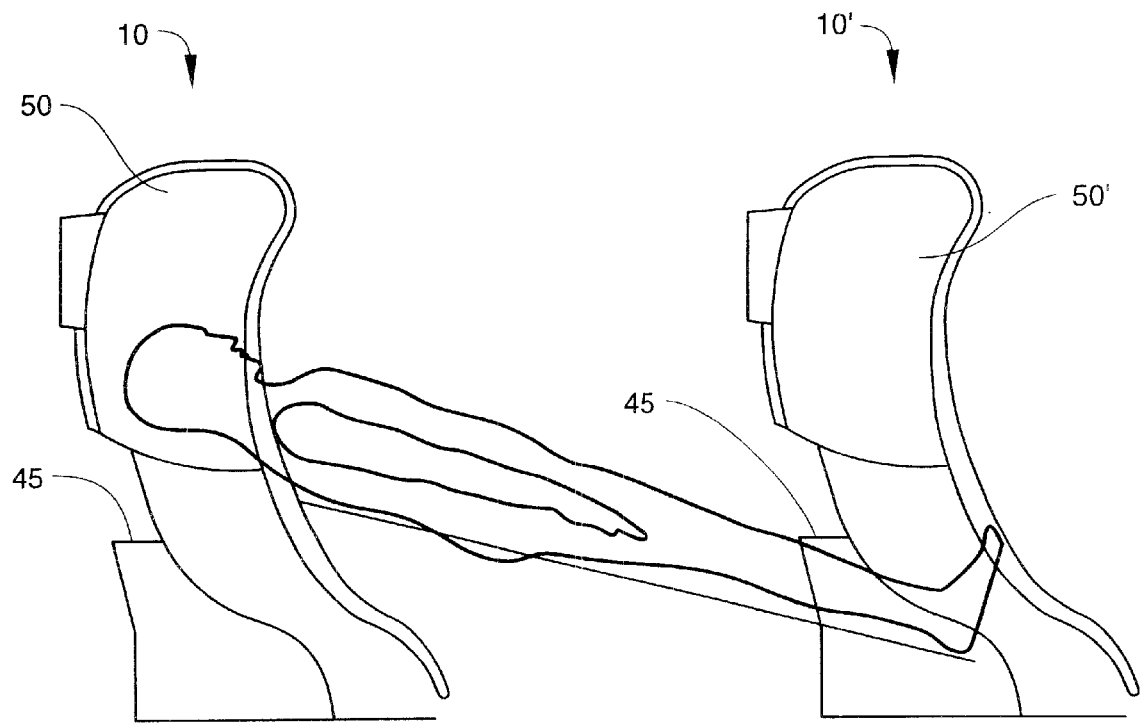
FIG. 9 is a schematic side elevation of two sleeper seats showing the egress step and footwell.

Referring now to FIG. 9, an overall simplified view of the the sleeper seats 10 and 10' demonstrates the extent to which space has been efficiently utilized in permitting a fully reclined sleeping position.

Figure 10A:
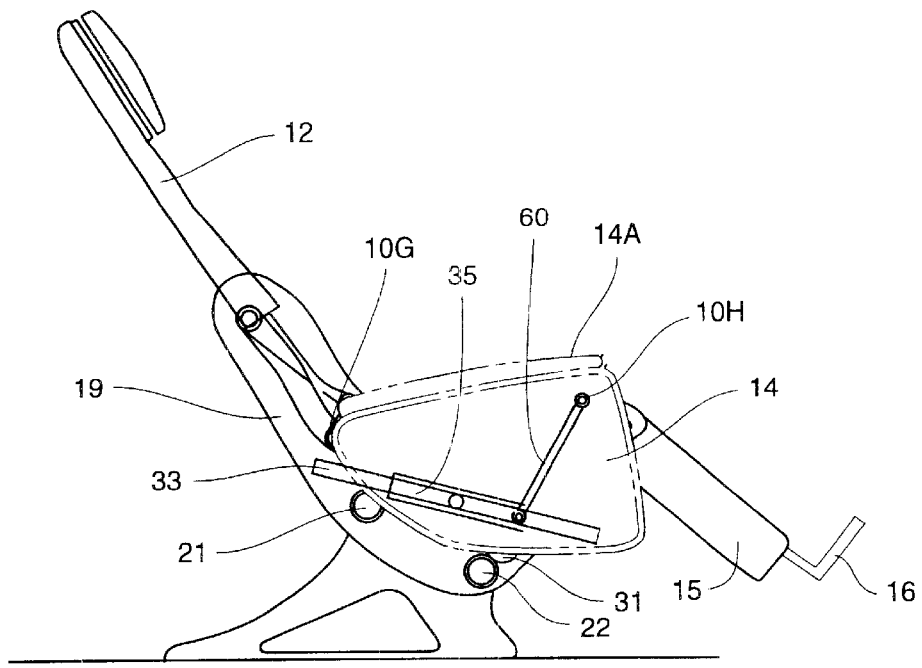
FIG. 10A is a side elevation of the sleeper seat shown in FIG. 1 in the semi-reclined position with the privacy shell and seat frame removed for clarity, and illustrating the structure of the armrest.
Figure 10B:
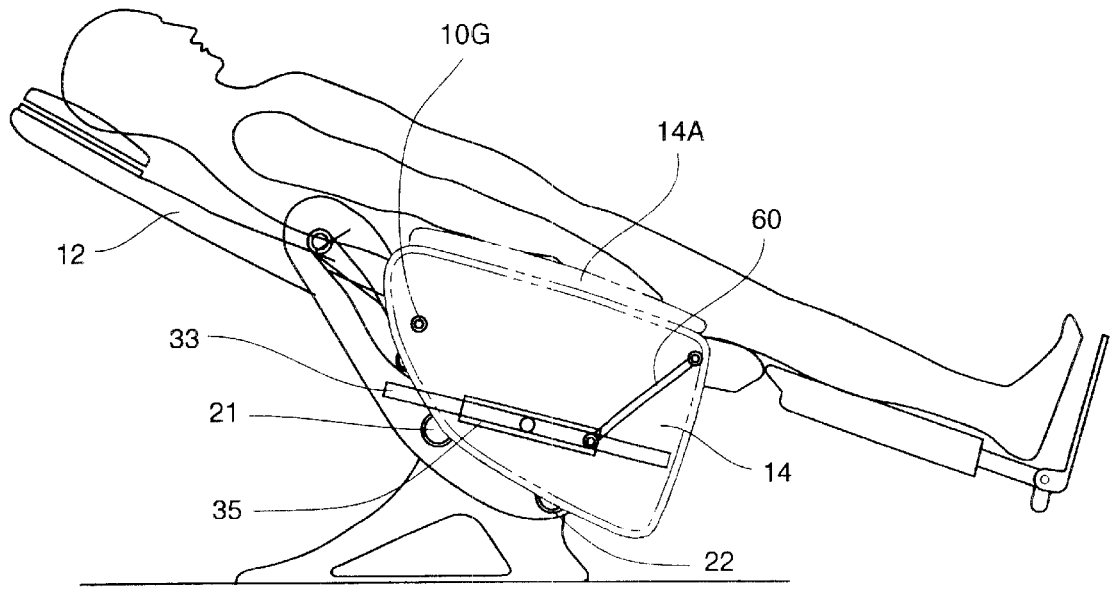
FIG. 10B is a partial side elevation of the sleeper seat shown in FIG. 10A placed in the fully reclined position.

Referring now to FIGS. 10A and 10B, armrest 14 of sleeper seat 10 is connected to the seat back at pivot location 10G and by an elongate linkage bar 60 to the seat at pivot location 10H. The other end of the linkage bar 60 is pivoted to the linear slide 35.

As is shown in FIG. 10A, the armrest 14 includes an upper 14A surface which extends generally parallel to the seat bottom 13 and is shaped to support a passenger's forearm. Pivotally connecting the armrest 14 at pivot locations 10GG and 10H, respectively, permits the upper surface of the armrest to remain in a generally parallel position relative to the seat bottom 13 as the seat bottom 13 and seat back 12 move among the upright, partially reclined and fully reclined positions.

As is shown in FIG. 10B, placing the sleeper seat 10 in the fully-reclined position causes the upper surface 14A of the armrest 14 to pivot downwardly from the rear to lie generally parallel to and flush with the upper surface of the seat bottom 13. This effectively creates a wider sleeping surface upon which the occupant may rest, since the occupant's arm may continue to lie comfortably on the upper surface 14A of the armrest 14. If the armrest 14 remained at the position shown in FIG. 10A, the occupant's arm would have to be placed next to the torso on the seat bottom 13, leaving less room for the remainder of the occupant's body.

Figure 11:
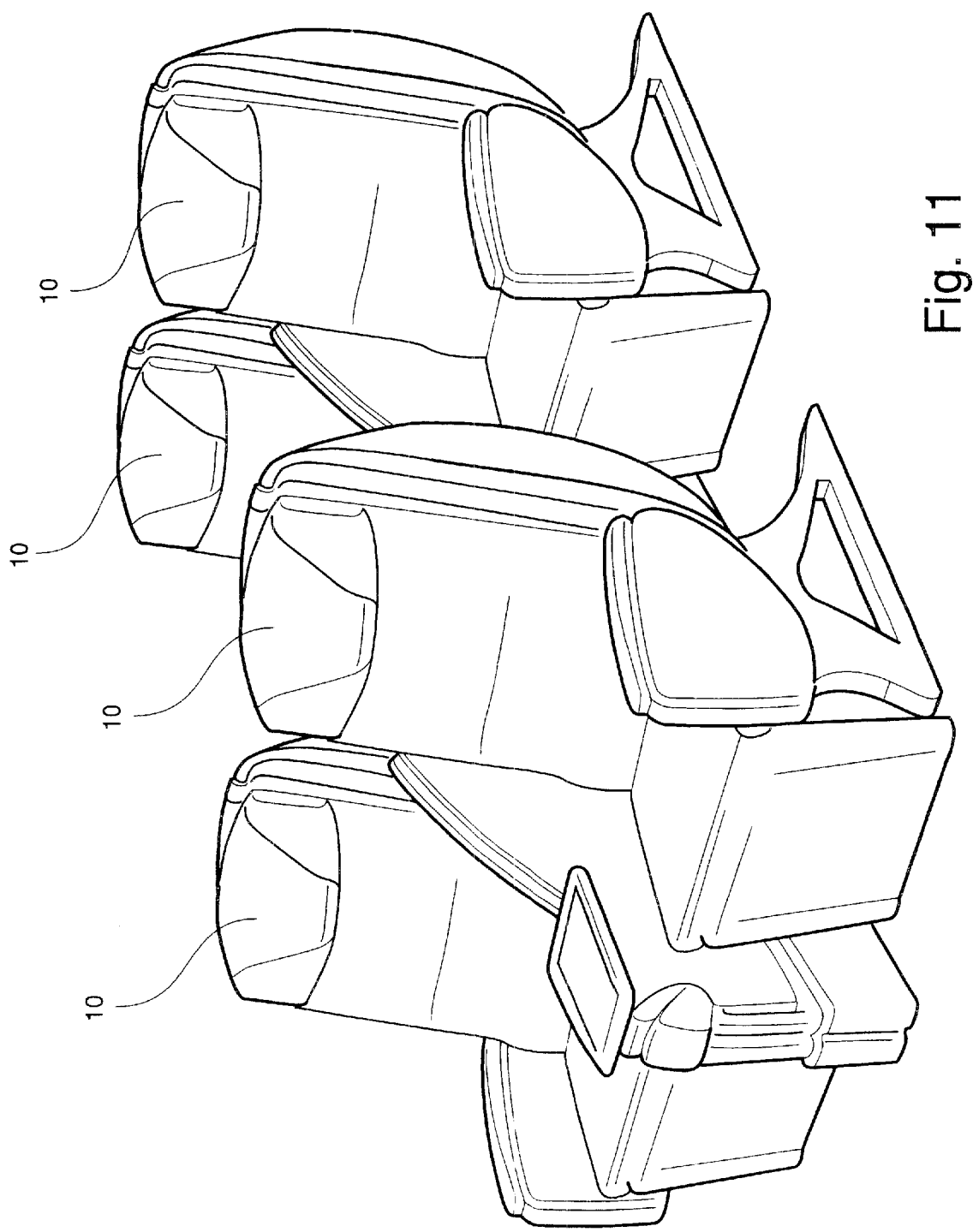
FIG. 11 is an environmental perspective view of two pairs of sleeper seats according to another preferred embodiment of the invention in the fully upright position.
Figure 12:
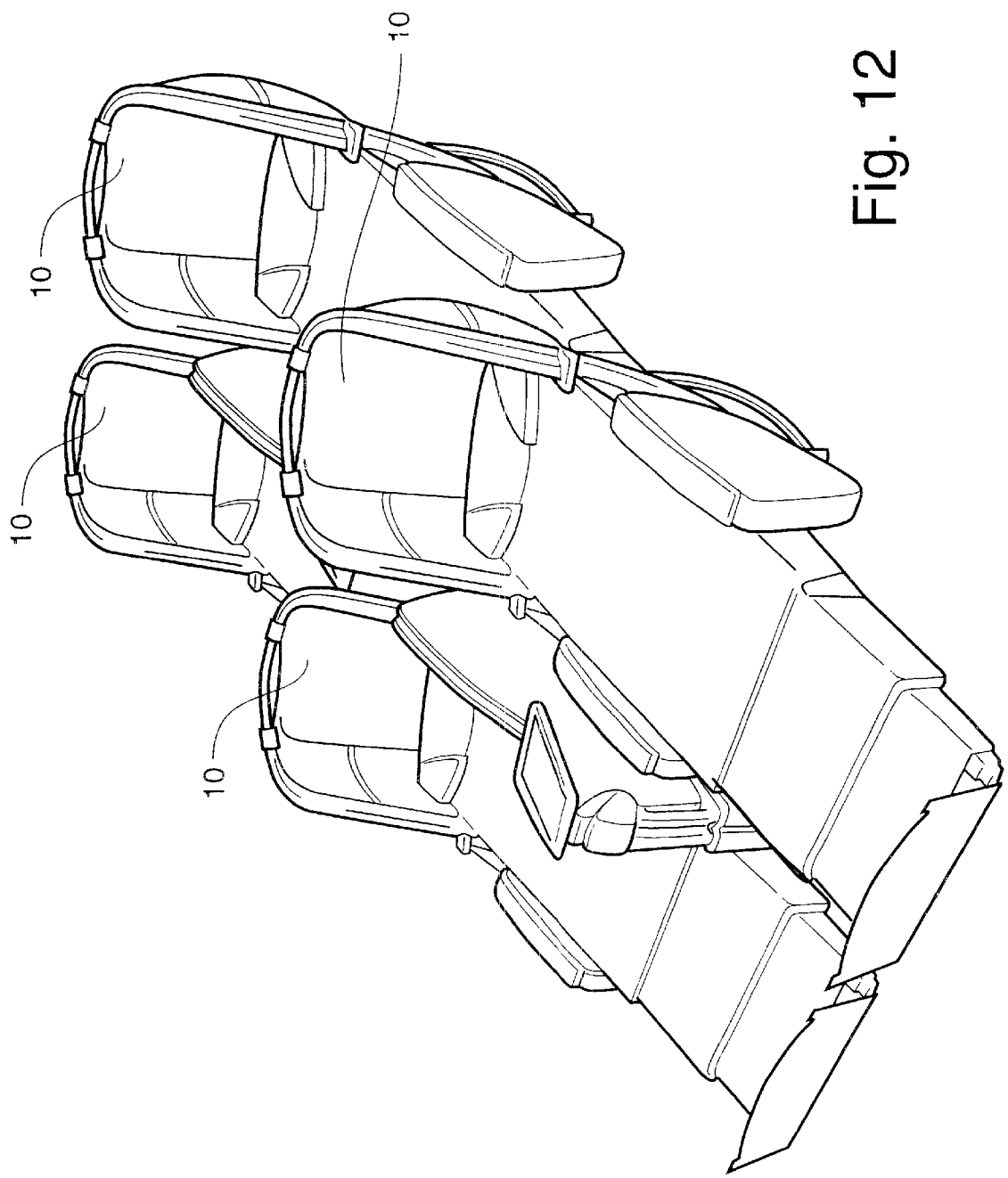
FIG. 12 is an environmental perspective view of the sleeper seats shown in FIG. 11 with the seats placed in the fully reclined position.

Referring now to FIGS. 11 and 12, two pairs of the sleeper seats according to one preferred stylistic embodiment of the invention are shown. As is typical, the ornamental appearance of the seats 10 may vary widely depending on the preference of the carrier in whose aircraft the seats will be installed. The carrier may also elect not to include some features, for example, the egress step 45. While they may be adapted for use on any type of aircraft or other transportation vehicle, the sleeper seats shown in FIGS. 11 and 12 are specifically intended for use on a Boeing 777. FIG. 11 shows each of the sleeper seats 10 in a fully upright position, and FIG. 12 shows each of the sleeper seats 10 placed in a fully reclined position.

Figure 13:
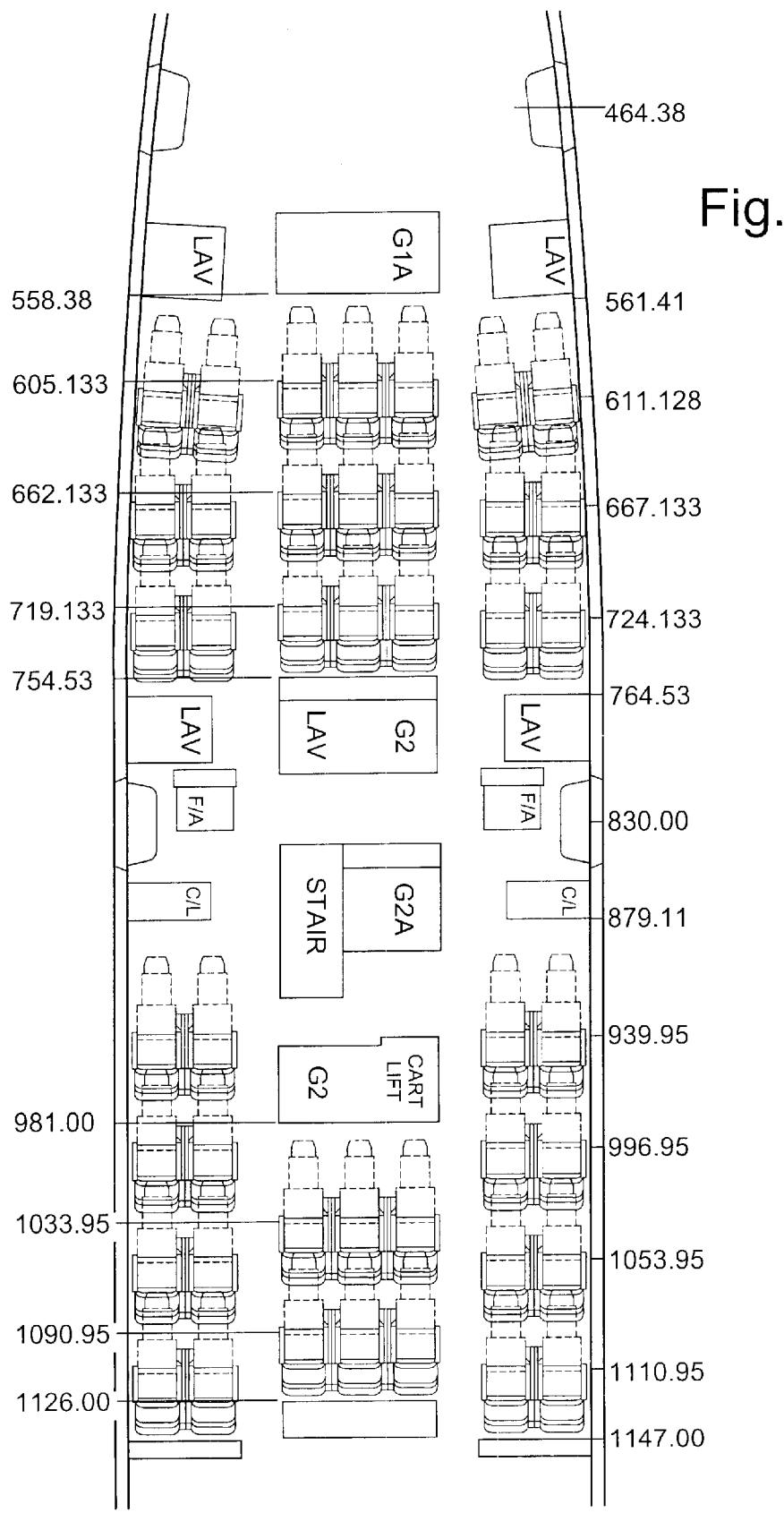
FIG. 13 is a top plan, cross-sectional, environmental view of multiple sleeper seats in configuration on the main deck of a Boeing 747.
Figure 14:
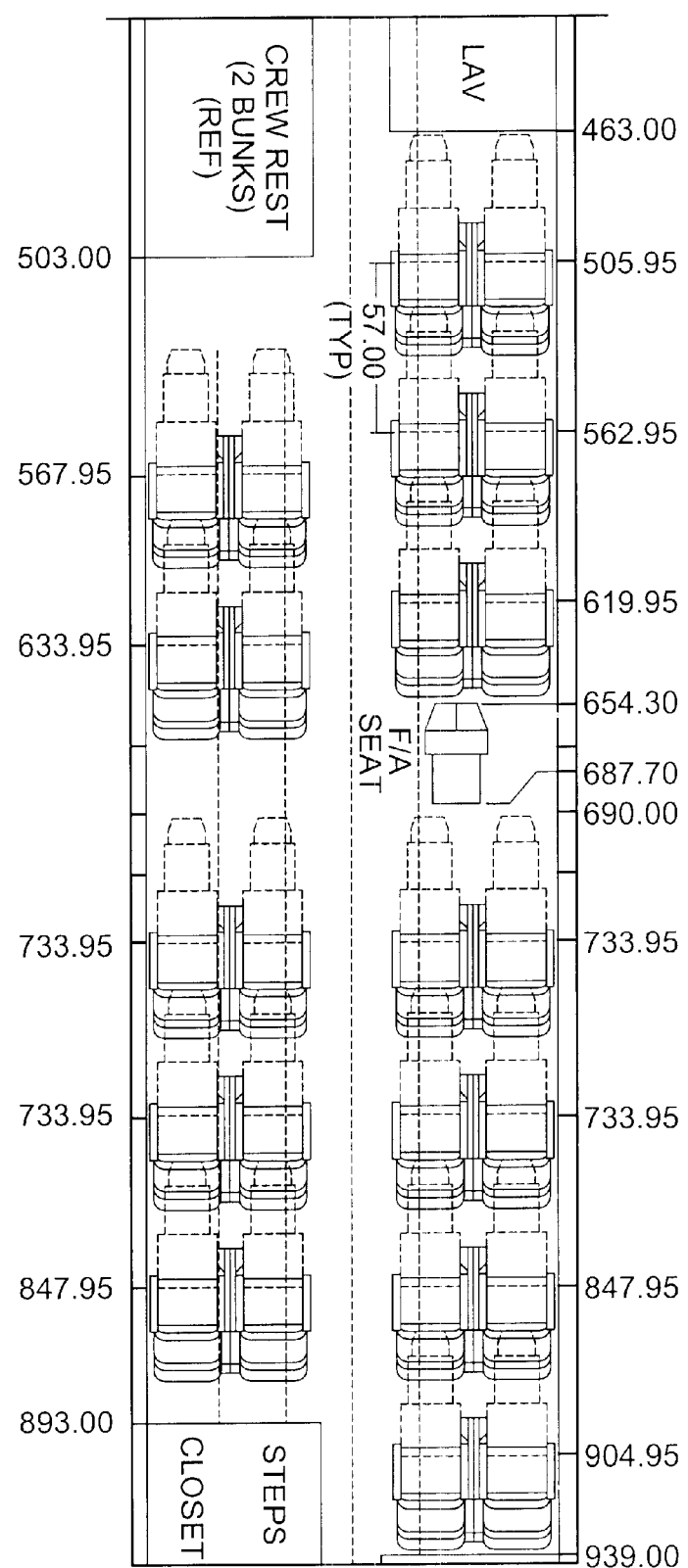
FIG. 14 is a top plan, cross-sectional, environmental view of multiple sleeper seats in configuration on the upper deck of a Boeing 747.
Figure 15:
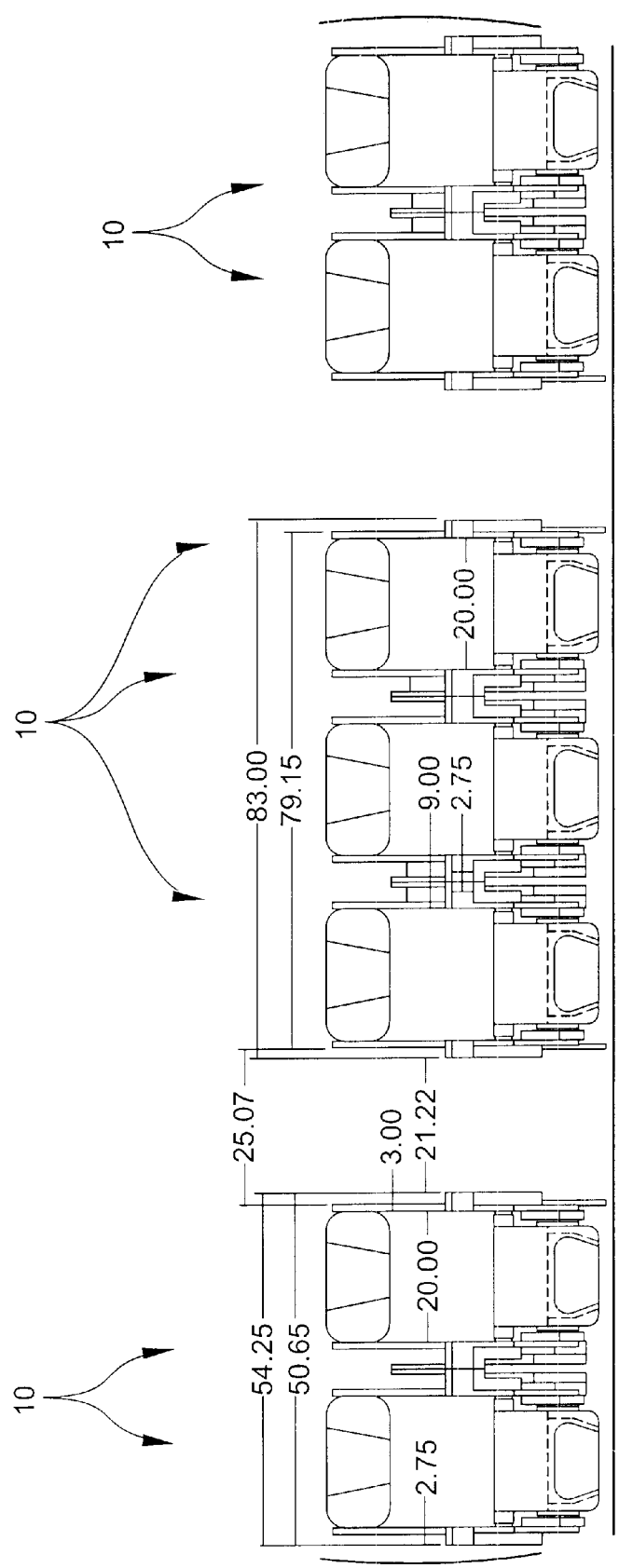
FIG. 15 is a cross-sectional view taken along line 38—38 of FIG. 36.
Figure 16:
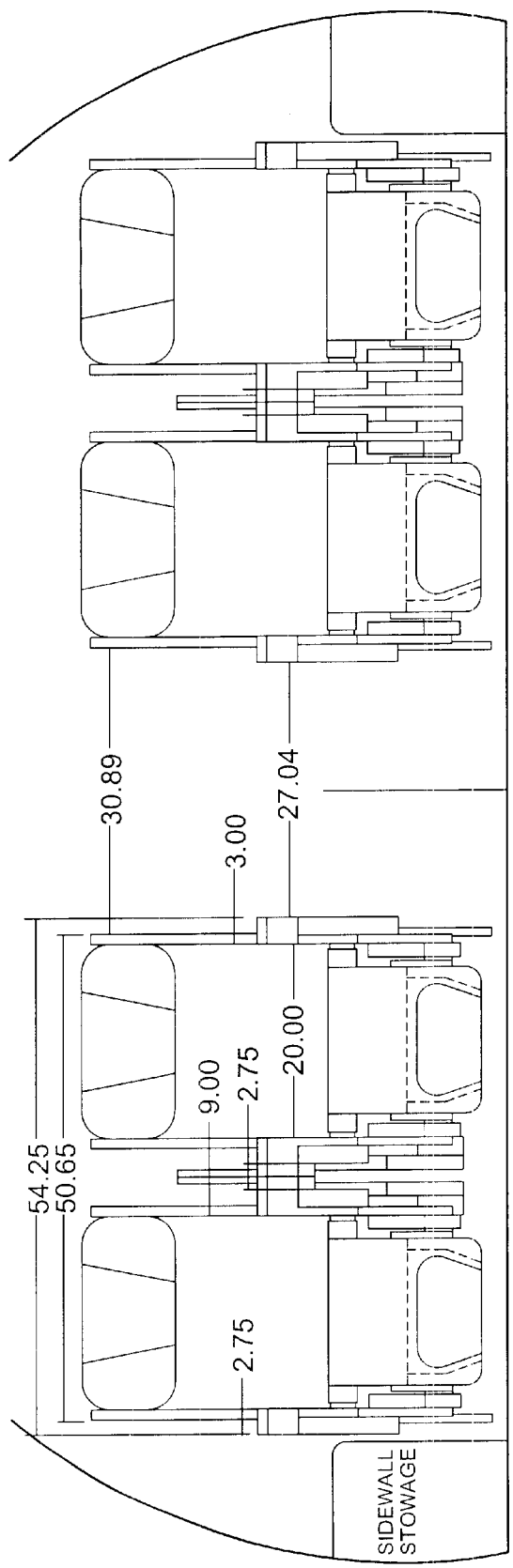
FIG. 16 is a cross-sectional view taken along line 39—39 of FIG. 37.
Figure 17:
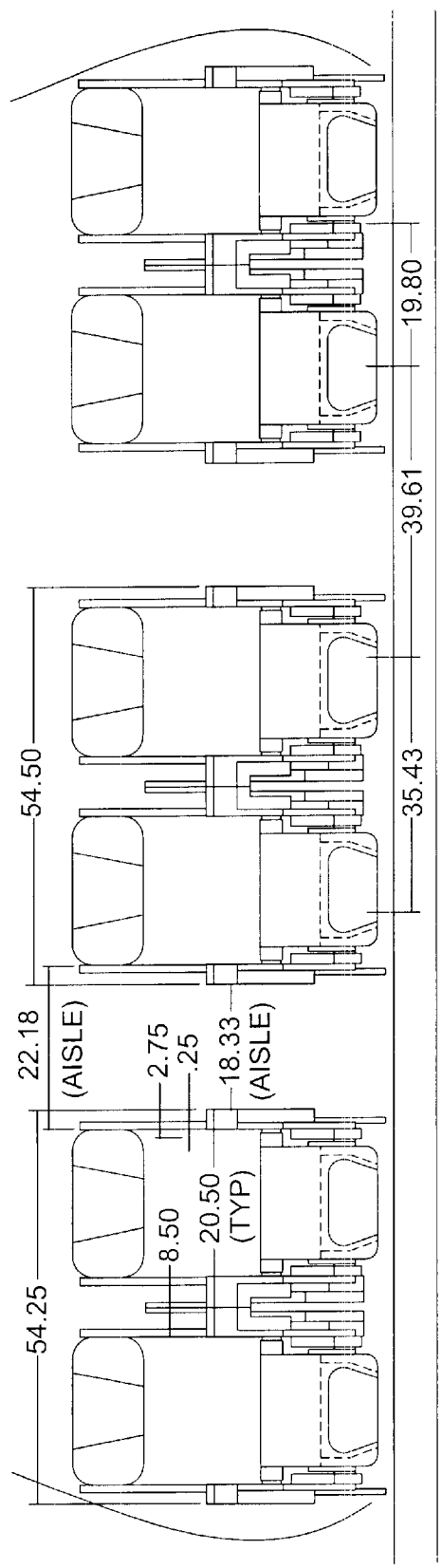
FIG. 17 is a cross-section view of multiple sleeper seats in configuration on an Airbus A340.

FIGS. 13 through 17 illustrate placement of the seats 10 in other actual aircraft cabin configurations. FIGS. 13 and 15 are top plan and front elevation views of a seating arrangement for a Boeing 747 main deck. FIGS. 14 and 16 are top plan and front elevation views of a seating arrangement for a Boeing 747 upper deck. FIG. 17 is a front elevation of a seating arrangement of an Airbus 340.

A sleeper seat is described above. Various details of the invention may be changed without departing from its scope. Furthermore, the foregoing description of the preferred embodiment of the invention and the best mode for practicing the invention are provided for the purpose of illustration only and not for the purpose of limitation.

We claim:

1. A reclining passenger seat, comprising:
   (a) a seat frame for being attached to a supporting deck;
   (b) a seat bottom carried by the seat frame;
   (c) a seat back carried by the seat frame and moveable with the seat bottom from and between an upright position, a semi-reclined position, and a fully-reclined sleep position;
   (d) a legrest assembly mounted adjacent a forward end of the seat bottom for being selectively extended generally downwardly and outwardly from the seat bottom for supporting the legs of the passenger;

(e) an armrest assembly carried by the seat frame and including an armrest moveable between:
  (i) a horizontal position with an upper support surface supporting a forearm of the seat occupant in the upright seat position;
  (ii) a forwardly-inclined, lowered position wherein the upper support surface is aligned with an upper surface of the seat bottom for providing a wider sleeping surface for the seat occupant when the seat is in the fully-reclined sleep position; and
  (iii) a rearwardly-inclined, intermediate position for supporting the forearm of the seat occupant in the semi-reclined seat position.

2. A reclining passenger seat according to claim 1, wherein the support surface of the armrest is parallel to an upper support surface of the seat bottom in the upright, semi-reclined, and sleep positions.

3. A reclining passenger seat according to claim 1, and further comprising:
  (a) a pivot for mounting the armrest by an aft portion thereof to a fixed pivotable position on the seat back; and
  (b) a linkage pivotally attached by respective upper ends to a forward end of the armrest and by a lower end to an elongate slide rail mounted to the seat frame, the lower end of the linkage attached by a linear slide to the slide rail for sliding movement along the slide rail during transition of the seat between the upright and sleep positions.

4. A reclining passenger seat according to claim 3, wherein:
  (a) the slide rail includes rack teeth thereon cooperating with a pinion gear driven by a drive actuator for movement of the seat back and seat bottom; and
  (b) the seat frame Includes guide slots in opposing lateral sides thereof in which are mounted guide rollers carried by the seat bottom and the seat back for guiding translational movement of the seat bottom and seat back.

5. A reclining passenger seat according to claim 1, and including a bolster positioned adjacent a forward end of the seat bottom and moveable between:
  (a) a retracted position when the seat is in the upright position; and
  (b) a deployed position when the seat is in the semi-reclined seat position and in the sleep position for providing support to the back of the leg and knee of the seat occupant.

6. A reclining passenger seat according to claim 1, and including a stationary privacy shell mounted aft of the seat frame for providing lateral privacy to the seat occupant when said seat is in the sleep position.

7. A reclining passenger seat according to claim 6, wherein the privacy shell includes a footwell for accommodating feet of an aft-seated seat occupant.

8. A reclining passenger seat according to claim 7, wherein the privacy shell includes a pivotally-mounted breakaway panel mounted on an aft-facing side of the privacy shell in a predefined head strike path for controlled forward movement about a pivot point in a crash situation wherein the head of an aft-seated seat occupant strikes the breakaway panel.

9. A reclining passenger seat according to claim 6, wherein the privacy shell includes an ingress/egress step formed therein and for permitting one aft-seated seat occupant to step over the legs of an adjacent seat occupant when ingressing or egressing the seat.

10. A reclining passenger seat, comprising:
  (a) a seat frame for being attached to a supporting deck;
  (b) a seat bottom carried by the seat frame;
  (c) a seat back carried by the seat frame and moveable with the seat bottom from and between an upright position, a semi-reclined position, and a fully-reclined sleep position;
  (d) a legrest assembly mounted adjacent a forward end of the seat bottom for being selectively extended generally downwardly and outwardly from the seat bottom for supporting the legs of the passenger;
  (e) an armrest assembly carried by the seat frame and including an armrest moveable between:
    (i) a horizontal position with an upper support surface supporting a forearm of the seat occupant in the upright seat position;
    (ii) a forwardly-inclined, lowered position wherein the upper support surface is aligned with an upper surface of the seat bottom for providing a wider sleeping surface for the seat occupant when the seat is in the fully-reclined sleep position;
    (iii) a rearwardly-inclined intermediate position for supporting the forearm of the seat occupant in the semi-reclined seat position;
  (f) wherein the support surface of the armrest is parallel to an upper support surface of the seat bottom in the upright, semi-reclined, and sleep positions.

* * * * *

UNITED STATES PATENT AND TRADEMARK OFFICE
CERTIFICATE OF CORRECTION

| | |
|---|---|
| PATENT NO. | : 6,692,069 B2 |
| DATED | : February 17, 2004 |
| INVENTOR(S) | : Beroth et al. |

Page 1 of 1

It is certified that error appears in the above-identified patent and that said Letters Patent is hereby corrected as shown below:

Column 7,
Line 35, delete "Includes" and enter -- includes --

Signed and Sealed this

Fourth Day of January, 2005

JON W. DUDAS
*Director of the United States Patent and Trademark Office*